Feb. 24, 1959  K. G. KAISER  2,874,923
CABLE BRACKETS
Filed Oct. 22, 1956
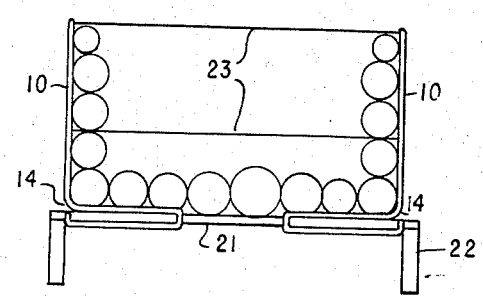
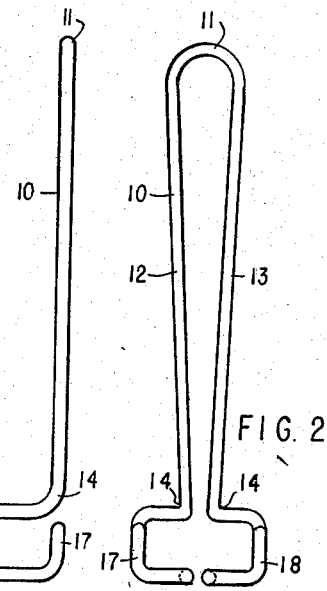
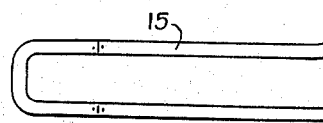
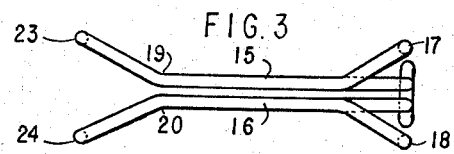
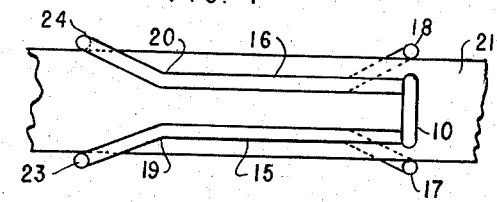
INVENTOR.
KENNETH G. KAISER
BY
ATTY.

United States Patent Office 2,874,923
Patented Feb. 24, 1959

2,874,923

CABLE BRACKETS

Kenneth G. Kaiser, Lombard, Ill., assignor to General Telephone Laboratories, Incorporated, a corporation of Delaware Application October 22, 1956, Serial No. 617,453

1 Claim. (Cl. 248—68)

The present invention relates to improvements in cable brackets to be used on cable runways to provide a channel for the cable or cables.

The principal feature of the invention is to provide an arrangement to be fastened to existing slats of cable runways. In telephone installations it has been the practice to lay the cables in rows on the cable slats and then lace them to the slats. This has been time consuming as well as expensive. If more than one row of cables were to be laid on a runway it involved addition time in lacing. A trough arrangement would be satisfactory but expensive and difficult to form.

It is the chief feature of my invention to provide cable brackets so formed as to clamp to an existing cable slat and, when clamped to the cable slat, permit the laying of cables between the brackets.

Another feature is that the bracket is formed from a single piece of wire and the spring tension of the formed wire clamps its edges on the cable slat.

The invention has been illustrated in the accompanying drawing, in which:

Fig. 1 is a side elevation view of the cable bracket.

Fig. 2 is a end view of the cable bracket taken from the right of Fig. 1, illustrating the spring tension in the vertical portion of the bracket.

Fig. 3 is a bottom view of Fig. 1.

Fig. 4 is a top view of the bracket attached to a cable slat to illustrate the clamping arrangement.

Fig. 5 illustrates the use of two brackets attached to a cable slat and showing cables between the two uprights of the brackets.

Referring to the drawing, wherein a preferred embodiment of the invention is illustrated, the wire cable bracket 10 comprises a single length of wire so twisted and bent as to form a vertical U shaped member 11 and two parallel U shaped members 15 and 16 forming a base for the vertical U shaped member. The wire 10 is bent at 11 to form two equal parts 12 and 13. The two parts 12 and 13 are bent at 90° at points 14 to form two U shaped members 15 and 16. The free ends 17 and 18 of the U shaped members 15 and 16 are bent upward and substantially parallel to the vertical members 12 and 13. The bights of the U shaped members 15 and 16 are flared outwardly as illustrated at 19 and 20. The free ends 17 and 18 are flared outwardly substantially the same as 19 and 20. The spring action of the wire, bent at 11, tends to hold the members 15 and 16 close together as illustrated in Fig. 2 and Fig. 3. The flaring of the ends of 15 and 16 forms a rectangular shaped passage for a cable slat 21.

A cable runway 22 as illustrated in Fig. 5 is made of a number of cable slats 21. The cable bracket 10 is slipped over the slat 21 by spreading the two sections 12 and 13 outwardly and thereby enabling the channel formed by the U shaped members 15 and 16 to grip the edges of the slat as shown in Fig. 4. The spring action of the vertical members 12 and 13 causes sections 17 and 23 of U shaped member 15 and 18 and 24 of U shaped member 16 to grip the edge of the slat 21. The slat 21 now is lying between the upper and lower side U members of 15 and 16 and the bights of the parallel U shaped members, and the upturned free ends of the parallel members are spring clamped against the side of the slat 21 to prevent sliding.

It can be readily seen that with the use of two of such brackets on a slat as shown in Fig. 5 a cable installer will be able to put several layers of cables between the brackets. If the layers of cables are extremely large it would be desirable to tie the brackets with lacing cord as shown at 23.

Thus it will be seen that I have invented a new and novel cable bracket formed from a single wire so shaped as to clamp on the slats of a cable runway.

What is claimed is:

A wire bracket for engaging the flat surfaces and edges of a rectangular shaped bar element comprising a vertical portion and a base portion, said vertical portion comprising substantially parallel segments of said wire, said base portion comprising a pair of U shaped extended segments of said parallel wires, the upper leg of each U shaped segment engaging the upper surface of said bar element and extending away from the bottom of said vertical portion and a portion of each upper leg being flared outwardly from each other near the bight portion of each U shaped segment, the bight portion of each U shaped segment engaging the edges of said bar element and connecting each upper leg to its respective lower leg of each U shaped segment, the lower leg of each U shaped member engaging the lower surface of said bar element and extending from said bight portion back toward said bottom vertical portion, each lower leg including an inwardly flared portion extending from said bight portion, an intermediate portion, an outwardly flared portion and a free end, said free ends of each lower leg being formed upwardly from said outwardly flared portion towards and substantially parallel to said vertical portion to engage said edges of said bar element.

References Cited in the file of this patent

UNITED STATES PATENTS

| | | |
|---|---|---|
| 574,145 | Gannon | Dec. 29, 1896 |
| 1,240,377 | Seng | Sept. 18, 1917 |
| 2,026,312 | Houts | Dec. 31, 1935 |